United States Patent [19]

Kato et al.

[11] Patent Number: 4,682,237

[45] Date of Patent: Jul. 21, 1987

[54] PHOTOGRAPHIC OPTICAL APPARATUS

[75] Inventors: Masatake Kato, Tokyo; Tetsuharu Nishimura; Hideo Yokota, both of Kanagawa, all of Japan

[73] Assignee: Canon Kabushiki Kaisha

[21] Appl. No.: 729,293

[22] Filed: May 1, 1985

[30] Foreign Application Priority Data

| May 7, 1984 [JP] | Japan | 59-90765 |
| Jun. 20, 1984 [JP] | Japan | 59-126825 |
| Aug. 24, 1984 [JP] | Japan | 59-176463 |
| Aug. 27, 1984 [JP] | Japan | 59-179059 |
| Dec. 27, 1984 [JP] | Japan | 59-280576 |

[51] Int. Cl.$^4$ .................. H04N 5/225; G02B 13/16
[52] U.S. Cl. .................. 358/225; 358/909
[58] Field of Search ............. 358/225, 228, 209, 224, 358/909; 354/476–479, 224–225, 219, 152, 155

[56] References Cited

U.S. PATENT DOCUMENTS

| 3,710,699 | 1/1973 | Mitani | 354/479 |
| 4,172,646 | 10/1979 | Matsumoto | 354/478 |
| 4,366,501 | 12/1982 | Tsunekawa et al. | 358/909 |
| 4,626,918 | 12/1986 | Morisawa | 358/225 |

FOREIGN PATENT DOCUMENTS 59-170835 11/1984 Japan .

Primary Examiner—Gene Z. Rubinson
Assistant Examiner—Stephen Brinich
Attorney, Agent, or Firm—Toren, McGeady & Associates

[57] ABSTRACT

A photographic optical apparatus including a beam splitter for splitting the optical path of an objective lens, a video pickup device arranged in one of the split optical paths, an optical low pass filter and a color separation filter arranged between the beam splitter and the video pickup device, a prism for changing the direction of the optical path arranged on the other split optical path, an eyepiece arranged on the optical path of the light coming through the prism, a pre-assumed image plane lying between the beam splitter and the prism and an image correcting plate of equal optical thickness to the sum of the lengths of the optical paths of the optical low pass filter and the color separation filter. The plate is arranged between the pre-assumed image plane and the beam splitter. The image correcting plate also serves to split off part of the light and then to guide it to a sensor for light metering.

28 Claims, 17 Drawing Figures

PHOTOGRAPHIC OPTICAL APPARATUS

BACKGROUND OF THE INVENTION

1. Field of the Invention:

This invention relates to photographic optical systems with a light arrangement to the light meter, and more particularly to photographic optical apparatus with a light arrangement suited to single-lens reflex cameras and electronic still cameras using image pickup tubes or solid state image pickup elements such as a CCD.

2. Description of the Prior Art:

As the single-lens reflex type of the camera using silver-halide film had the highest potential for expanding the system, it has developed to a high degree of versatility. Its typical optical system is partly shown in FIG. 1.

In the same figure, a photographic lens 100 is followed by a flippable total reflection mirror 101 in front of a focal plane shutter 102 and a film plane 103. A focusing screen 104, a pentagonal roof type prism 105, and an eyepiece 106 constitute a finder optical system through which an eye 107 can observe an image on the focusing screen 104 in the conjugate plane to the film plane 103 with respect to the photographic lens 100.

To measure the object brightness with the light entering through the photographic lens 100, the so-called TTL type light meter has its sensor, in most cases, positioned either on the bottom face or the exit face of the pentagonal roof type prism 105.

The silver-halide film can be replaced by an image pickup tube or a solid state image pickup element such as a so-called CCD to thereby form an electronic camera. For such an electronic camera, particularly that using the single-tube type or the monoplane type, image pickup, it is necessary to employ additional optical members such as an infrared ray cut filter, an optical low pass filter, a color separation filter and a protection glass plate arranged in a space between the photographic lens 100 and the image plane.

The infrared ray cut filter is used for preventing color purity from being lowered with the reproduced image becoming turbid, since the image pickup board or element is sensitive to light of the infrared region which the human eye cannot see. The optical low pass filter rids the object image of a space frequency component which is higher than a certain level and which turns to spurious signals, for example, when the single-tube type camera employs the stripe filter for color separation purposes and is usually in the form of a crystal plate to utilize the phenomenon of double refraction. The color separation filter, when in a frequency separation system or a phase separation system, is striped or mosaic in structure so that the image is separated in three basic colors, namely, red, green and blue. The protection glass covers the image pickup surface and, in some cases, also serves as a filter.

In the case of the electronic still camera already in existence, the optical low pass filter is put in front of the quick return mirror for reflecting light from the object lens to the finder. However, this makes the finder image difficult to see. To avoid this, therefore, a crystal plate must be used in the optical path of the finder to cancel that effect. This measure results in a reduction in flexibility of design of the interior element arrangement of the camera and also is a source of increased production cost.

SUMMARY OF THE INVENTION

An object of the present invention is to provide an electronic still camera with means for making it possible to observe a finder image of good quality.

Another object of the present invention is to realize a TTL (Through-The-Lens) type light metering with a high efficient structure of the light arrangement therefor.

A photographic optical apparatus including optical path splitting means for splitting an optical path of an objective optical system, image receiving means arranged in one of the split optical paths to receive an image of the objective optical system and produce a video signal; optical means arranged between the optical path splitting means and the image receiving means to apply optical means to apply optical filtering to an image to be received by the image receiving means; prismatic optical means arranged on the other split optical path to change the direction of the optical path; a preassumed image plane lying in between the optical path splitting means and the prismatic optical means; an eyepiece for observing the preassumed image plane through the prismatic optical means; and optical correcting means for correcting the image performance due to the objective optical system arranged in a space between the optical path splitting means and the preassumed image plane and having an optical path length which is substantially equal to the optical path length of the optical means.

DETAILED DESCRIPTION OF THE PREFERRED EMBODIMENTS

Figure 1:
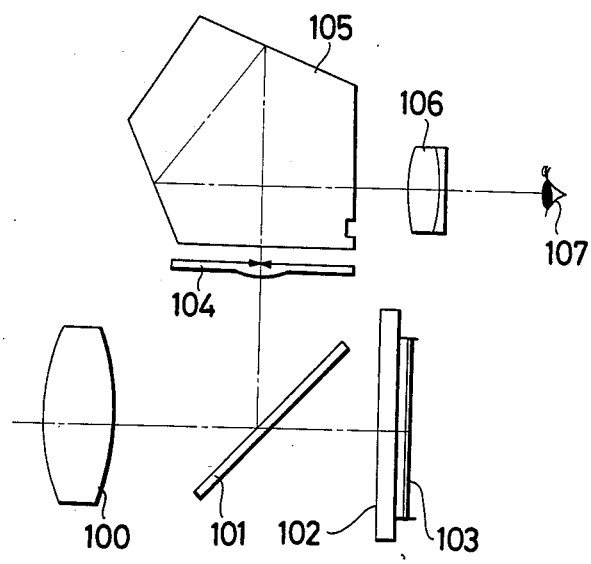
FIG. 1 is a sectional view of the optical system of the conventional single-lens reflex camera.
Figure 2:
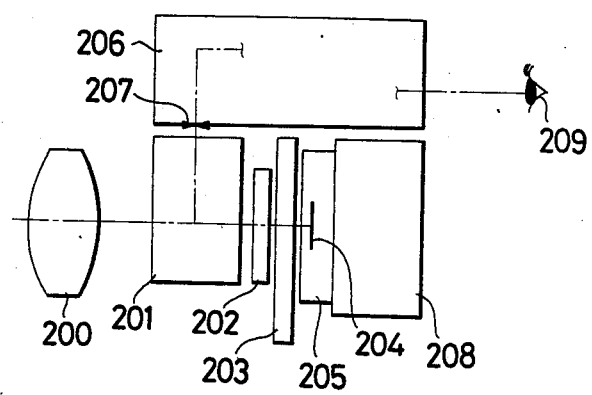
FIG. 2 is a schematic sectional view of an optical apparatus according to the present invention.

FIG. 2 illustrates the outline of an electronic still camera. The optical system thereof comprises a photographic lens 200, a beam splitter unit 201 for splitting off part of an image bearing beam to a finder optical system, a low pass filter 202, a shutter unit 203, and an image pickup element 204 in a package 205 whose front protection glass plate has an infrared ray cutting effect arranged on a common optical axis. The finder optical system comprises a finder unit 206 including an image erecting and lateral-inversion correcting system with a focusing screen 207. Reference numeral 208 identifies a video signal processing circuit unit, and 209 an eye of the observer.

Since, in the electronic camera of FIG. 2, many optical members comprising various filters intervene between the beam splitter 201 and the image pickup element, 204 the image bearing beam is subjected to refraction many times as it passes through the surfaces of these optical members. When the relative aperture of the photographic lens 200 is large, the image aberrations and particularly the spherical aberration are largely influenced by these optical members.

The photographic lens 200 for the electronic camera using many and various optical members as shown in FIG. 2 must, therefore, be designed in such a way that aberrations are sufficiently corrected with the addition of a glass block of which the axial thickness is determined by taking into account the influence of the above-mentioned optical members on the various image aberrations.

As the finder optical system is not included with a glass block equivalent to the aforesaid one, aberrations of an opposite sign are, therefore, introduced in the finder image. One of the features of the invention is that an image aberration correcting plate, though shown as a beam splitter 308 in FIG. 3, is provided with the length of its optical path made equal to the sum of the lengths of the optical paths of the optical members in the space between the quick return mirror 302, the beam splitter 308, and the image pickup surface 306.

In a general embodiment, the axial thickness of the correcting plate or beam splitter 308 may be almost equal to the sum of the axial thickness of the above-identified optical members, preferably within a range of plus and minus 20% wider values than that sum. The use of such a correcting plate 208, in constituting part of the finder optical system, provides improvement of the quality of the finder image to a degree nearly equal to that of the quality of the object image on the focal plane of a photographic lens 301.

Figure 3:
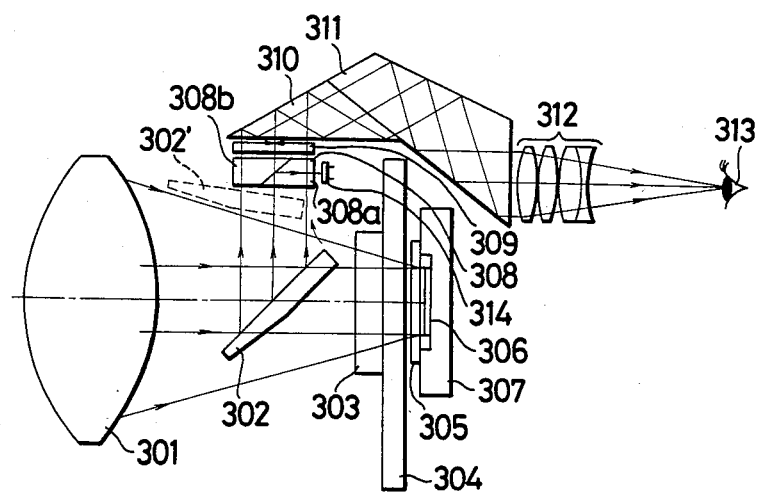
FIG. 3 is a sectional view of an embodiment of the apparatus according to the invention.

Another feature of the invention is that in the embodiment of FIG. 3, the correcting plate 308 is so constructed as to have an additional function of splitting off part of the beam to a light meter, thereby giving an advantage of improving the efficiency of the structure of the light arrangement for the light meter.

In FIG. 3, the optical apparatus includes the photographic lens 301, the quick-return mirror 302 which, upon actuation of a camera release, retracts a position 302' shown by dashed lines, a low pass filter 303, a shutter unit 304, and a color separation filter 305 which also serves as a protection glass for a video image pickup element having an image receiving surface 306 within a package 307.

Light entering through the photographic lens 301 is reflected from the quick-return mirror 302 to the beam splitter 308. That part of the light which passes through the beam splitter 308 focuses on a sensing plane of a focusing screen 309.

A finder image on the focusing screen 309 is turned into a correct image by a prism 310 and a roof type prism 311 having roof surfaces and is observed by an eye 313 looking through an eyepiece 312. Note, the optical axis of the photographic lens 301 rather than the position of the focusing screen 309.

The beam splitter 308 is constructed from two glass prisms 308a and 308b having opposing slanted surfaces at which the prisms are cemented together, after a half-reflection coating is applied to one of the slanted surfaces. This coating functions to direct the input ray sideward to a photosensitive element 314 of the light meter positioned at the side of the beam splitter 308.

It is preferable to position the beam splitter 308 as near the focusing screen 309 as possible because this provides an advantage of proportional variation of the light value with the F-number and the center-weighted light metering function.

As the beam splitter 308 for light measurement has another function of improving the quality of the finder image to a degree nearly equal to that of the quality of the object image on the focal plane, it is preferable that the axial thickness of the beam splitter 308 be nearly equal to, but less than 20% wider, or narrower, than the sum of the axial thicknesses of the low pass filter 303 and the protection glass 305.

In many practical cases, the axial thickness of the beam splitter 308 ranges from 3 to 12 mm. Thanks to such a wide range, the freedom of choice of the size of area and the inclination of the half-reflection coating is high enough to allow for improvement of the efficiency in the structure of the construction of the light conducting means to the photosensitive element 314. Another advantage is that it is easy to provide both spot and average metering modes.

The beam splitter 308 and the focusing screen 309 may be formed, in the alternative, as a unit with its upper surface in coincidence with the plane on which the finder image is cast, thereby giving an additional advantage of further simplifying the structure of the finder optical system.

Figure 4:
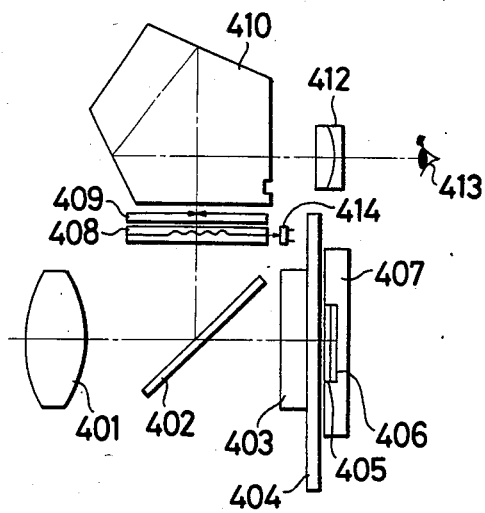
FIG. 4 is a sectional view of another embodiment of the apparatus according to the invention.

FIG. 4 illustrates another embodiment of the invention applied to a camera with its finder optical system using a pentagonal roof type prism 410. The optical apparatus includes a photographic lens 401, a fixed half-reflection mirror or a flippable total reflection mirror 402, a low pass filter 403, a shutter unit 404, and a protection glass plate 405 and an image pickup element 406 in a package 407. A finder beam reflecting off the half-reflection mirror 402 passes through a beam splitter 408 forming an object image on a focusing screen 409. The finder image is turned into a correct image by the pentagonal roof type prism 410 and can be observed through an eyepiece 412 by an eye 413. That part of the incident light on the beam splitter 408 which is split off, is conducted sideways through the interior thereof, arriving at a photosensitive element 414.

The beam splitter 408 for light measurement used in this embodiment is similar in construction to that disclosed in U.S. patent application Ser. No. 449,416 (Japanese Laid-Open Patent Application No. SHO 58-106518) for example, as shown in FIG. 5.

Figure 5:
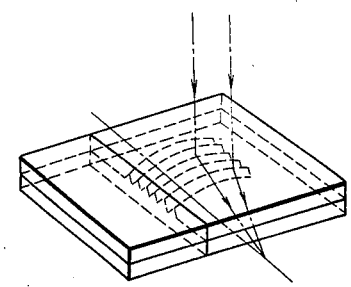
FIG. 5 is a perspective view of a constituent element.

The beam splitter of FIG. 5 is constructed from two parallel flat glass plates cemented together at their adjoining surfaces, one of which has a large number of grating-like ribs formed therein with the curvature determined so that the split-off light converges in one direction. The array of these ribs has an equivalent function to that of the optical grating so that the light incident on the array changes its direction in diffracting, and the diffracted light is transmitted along the principal plane to emerge sideways.

Figure 6:
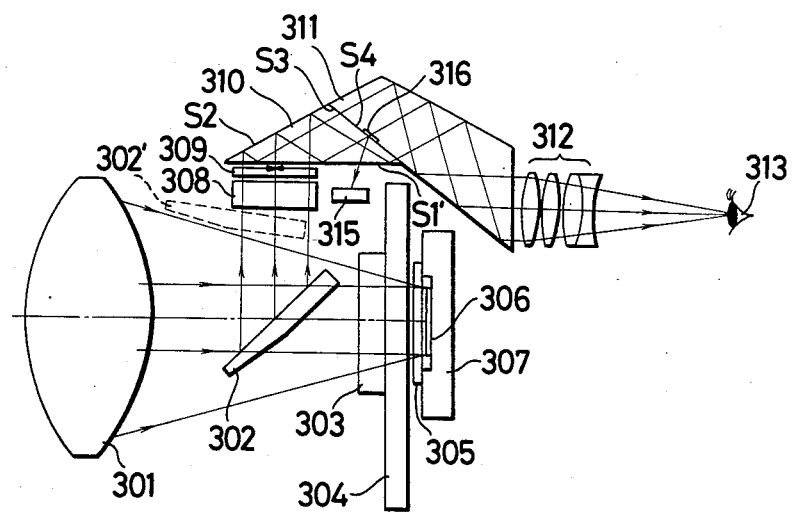
FIG. 6 is a sectional view of still another embodiment of the apparatus according to the invention.

FIG. 6 illustrates another embodiment of the light arrangement for the light meter according to the invention applied to the optical apparatus of FIG. 3. Either an exit face S3 of the first prism 310, or an entrance face S4 of the second prism 311 is made half-mirrored in a patch 316. This mirror 316 splits off part of the light radiating from the object image on the focusing screen 309 and directs it past the bottom or second reflecting face of the first prism 310 to a light sensor 315 for measuring the object brightness level, while permitting the other part of the light to pass therethrough to the eyepiece 312. The size of the beam splitter or mirror patch 316 and its orientation are so chosen as to provide a desired light meter sensitivity pattern, while preserving a viewfield percentage of more than 90% at a finder image magnification of more than 0.6.

Figure 7:
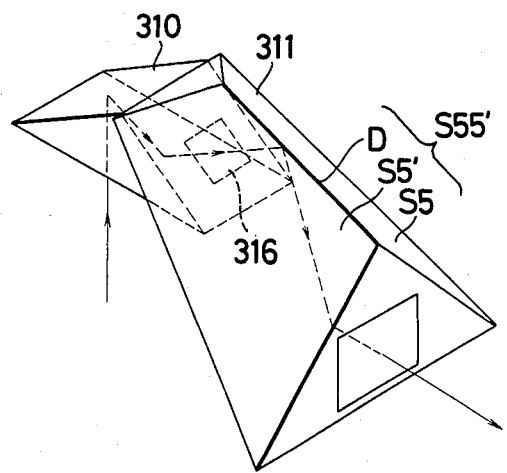
FIG. 7 is a perspective view of the prism of FIG. 6.

A perspective view of the first prism 310 and the second prism 311 of FIG. 6 is given in FIG. 7. As is understandable from FIG. 7, the first prism 310 is in the form of a triangle pole, and the second prism 311 has a roof $S_{55}'$ of two reflection faces $S_5$ and $S_5'$ meeting at a ridge line D.

Figure 8:
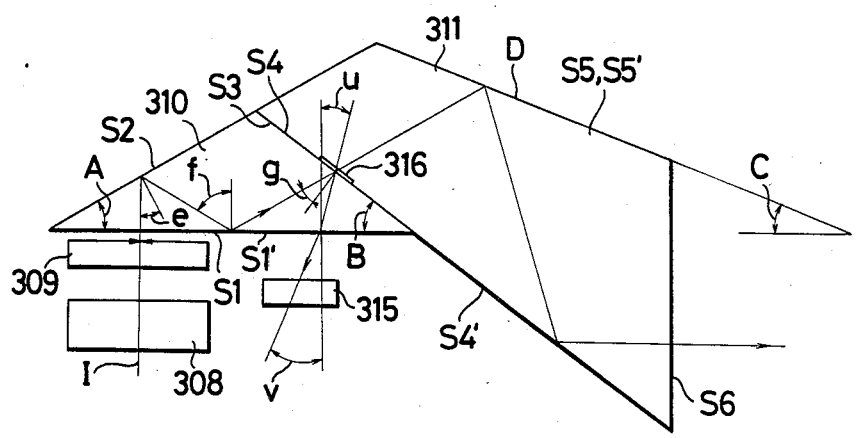
FIG. 8 is a diagram of the main parts in another embodiment of the invention.

In FIG. 8 there is next shown how a principal ray I passes through the first and second prisms 310 and 311. The ray I, on the optical axis of the finder, is incident on an entrance face $S_1$ of the first prism 310 at almost right angles and is reflected off a first reflecting face $S_2$, with a reflective coating thereon, to a second reflecting face $S_1'$, which lies flush with the entrance face $S_1$, and therefrom is directed, either by total reflection or by a mirror coating thereon, to an exit face $S_3$. The output ray I then enters the second prism 311 at a face $S_4$ and is reflected off a roof $S_{55}'$, with mirrored faces $S_5$ and $S_5'$, to a fourth reflecting face $S_4'$, which lies flush with the entrance face $S_4$. After reflection from the face $S_4'$, the ray emerges from an exit face $S_6$ at nearly right angles, going to the eyepiece 312.

As the image on the focusing screen 309, though erected by the quick return mirror 302 of FIG. 6 is laterally inverted, the prism assembly of FIG. 8 operates in such a manner that the image is then twice inverted vertically by the first and second reflecting faces $S_2$ and $S_1'$ of the first prism 310, then once laterally and once more vertically inverted by the roof $S_{55}'$ of the second prism 311, and then once again vertically inverted by the fourth reflecting face $S_4'$. Thus, in total, a correct image is obtained.

Meanwhile, as shown in FIG. 8, the beam splitter or mirror 316, between the exit face $S_3$ of the first prism 310 and the entrance face $S_4$ of the second prism 311, directs its split-off light from the image on the focusing screen 309, toward the light sensor 315 positioned beneath the second reflecting face $S_1'$ of the first prism 310.

How to arrange the optical path from the beam splitter or mirror 316 to the light sensor 315, past the second reflecting face $S_1'$ of the first prism 310, will next be described.

For the ray I incident on the entrance face $S_1$ of the first prism 310 at right angles, letting the reflex angle of the ray I with the normal of the first face $S_2$ being denoted by "e", the reflex angle with the normal of the second face $S_1'$ by "f", the reflex angle with the normal of the beam splitter or mirror 316 assumed, for the purpose of simplicity, to be on the exit face $S_3$ by "g", the angle of incidence of the ray I on the second reflecting face $S_1'$ by "u", the angle the entrance and the first reflecting faces $S_1$ and $S_2$ make with each other by A, the angle that the entrance and exit faces $S_1$ and $S_3$ make with each other by B, the angle of the ridge line D of the roof $S_{55}'$ of the second prism 311 with the entrance face $S_1$ by C, and the refractive index of the medium of each of the first and second prisms 310 and 311 by N, we have $e = A$ $f = 2A$ $g = 2A - B$ $u = 2(B - A)$ Now suppose that $A = 30°$, $C = 22°$, $N = 1.7725$, and that the angle of emergence of the ray I from the exit face $S_6$ of the second prism 311 is 90°, it is found from $B = 45° - A + C$ that $B = 37°$ and $u = 14°$.

Under this value of the incidence angle, u, without its suffering total reflection from the second reflecting face $S_1'$, the split-off ray leaves the first prism 310 at an angle of emergence determined based on the formula $v = \sin^{-1}(N \cdot \sin u)$, namely, $v = 25.4°$, impinging on the light sensor 315.

In this embodiment, it is preferred that the angles A and C fall within the following ranges:

$20° < A < 40°$ $10° < C < 40°$

If a finder optical system is designed so as to satisfy the above-stated conditions, the split-off light bundle is transmitted to the light sensor 315 with a high efficiency, while still permitting minimization of the bulk and size of the finder optical system.

Thereby, while all the rays reflected off of the first reflecting surface $S_2$ toward the light sensor 315 are blocked by the second reflecting face $S_1'$ from reaching it, all the split-off rays from the mirror 316 are allowed to pass across the second reflecting face $S_1'$ to the light sensor 315.

Note, if the second reflecting face $S_1'$ does not provide perfect total reflection for the rays coming from the first reflecting face $S_1$, it may be all mirrored by using a reflective coating deposited thereon except at a portion through which the rays reflected from the beam splitter or mirror 316 pass.

Figure 9:
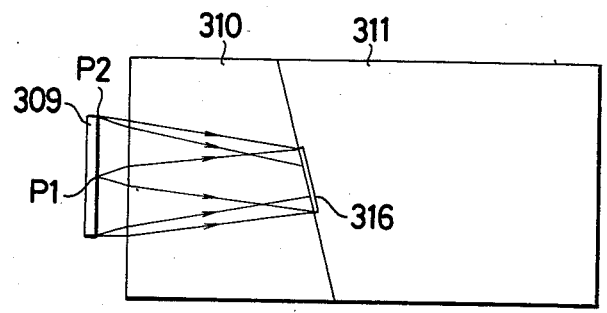
FIG. 9 is a plan view of the main parts.

Referring next to FIG. 9 in a schematically expanded view of the first and second prisms 310 and 311, what determines a distribution of light intensities over the light receiving surface of the light sensor 315, is shown, where the light from a central portion $P_1$ of the area of the focusing screen 309 is reflected off the light beam splitter or mirror 316 at a higher rate than light from a marginal portion $P_2$.

Figure 10:
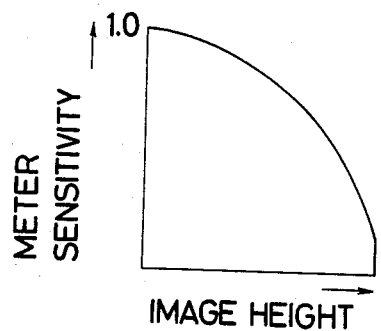
FIG. 10 is a graph of the variation of the sensitivity of the light meter with the image height.

For this reason, the sensitivity of the light meter decreases as the distance from the center of the area of the picture frame increases, as shown in FIG. 10, giving a center-weighting meter sensitivity pattern. Other patterns such as average and spot light meter sensitivity patterns can be also obtained when the sizes and orientations of the beam splitter or mirror 316 and the light receiving surface of the meter 315 are so adjusted.

On the other hand, one of the causes of lowering the accuracy of light measurement is by light entering from the eyepiece 312 backwards.

Figure 11:
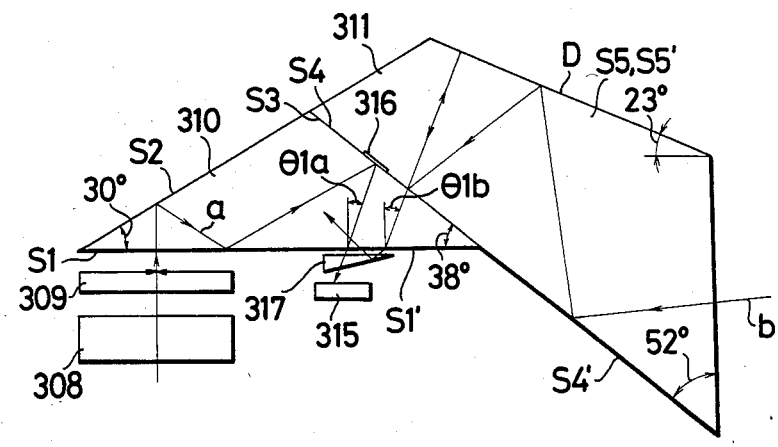
FIG. 11 is a diagram of the main parts in another embodiment of the invention.

FIG. 11 illustrates a practical example of means for preventing the backward light from arriving at the light sensor 315 of the meter, constructed in the form of a wedge prism 317 and arranged adjacent to the second reflecting surface $S_1'$ of the first prism 310 and just in front of the light sensor 315.

In the same figure, "a" represents one of the rays entering through the photographic lens 301 (FIG. 6), passing through the focusing screen 309 to the entrance face S1 of the first prism 310 and therefrom going to the beam splitter or mirror 316, and "b" represents one of the rays entering backward from the exit face $S_6$. Both of these rays "a" and "b" emerge from the second reflecting face $S_1'$.

Let us now evaluate angles of incidence, $\theta_{1a}$ and $\theta_{1b}$, of the rays "a" and "b" on the second reflecting face $S_1'$ respectively as defined in FIG. 11. The value of the angle $\theta_{1b}$ becomes minumum when the ray reflects from the roof $S_{55}'$ at right angles with respect to the ridge line D. Of the angles of the prisms 310, 311, the angle that the entrance face $S_1$ and the first reflecting face $S_2$ make with each other is 30 degrees, the angle that the entrance face $S_1$ and the exit face $S_3$ make with each other is 38 degrees, and the angle that the ridge line D and the entrance face $S_1$ make with each other is 23 degrees. Then, a range for the angle $\theta_{1b}$ is set forth in which $\theta_{1b} \geq 23°$.

For the other angle $\theta_{1a}$, if the ray "a" is the principal ray parallel with the optical axis of the finder, after reflection from the light beam splitter or mirror 316, it is incident on the face $S_1'$ at an angle of $\theta_{1a} = 16°$. On the assumption that the photographic lens 301 is telecentric with its F-number being 1:1.8, and the focusing screen 309 is non-diffusive, in order that a ray may emerge from the second reflecting face $S_1'$, this ray must be incident on the second reflecting face $S_1'$ at an angle of $16° \pm 15.5°$. In other words, it is required that $0.5° \leq \theta_{1a} \leq 31.5°$.

In this embodiment, by utilizing the fact that, as has been stated above, the useful light for light measurement and the backward or harmful light have different angles of incidence on the second reflecting face $S_1'$, or different angles of emergence therefrom, discrimination between these two lights occurs and the useful light is extracted for transmission to the light sensor 315.

Figure 12:
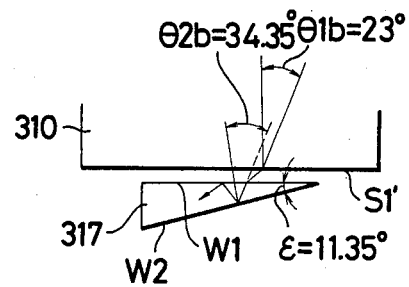
FIGS. 12 and 13 are diagrams to explain the optical functions respectively.

In actual practice, as shown in FIG. 12, the wedge prism 317 is oriented with is upper or entrance face $W_1$ in parallel with the second refelecting face $S_1'$, and points rearward, a vertical angle $\epsilon$ is taken at a value of $\epsilon = 11.35°$, and the first prism 310 and the wedge prism 317 are made of the same glass having a refractive index of $N = 1.7725$. The ray incident on the second reflecting face $S_1'$ at an angle of $\theta_{1b} = 23°$ is then caused to emerge therefrom and to enter the wedge prism 317 at a face $W_1$, being incident on an exit face $W_2$ at an angle of $\theta_{2b} = 34.35°$. Because this value exceeds the critical angle, the incident ray undergoes total reflection.

Therefore, by such construction and arrangement of the wedge prism 317, all that can pass across this prism 314 is limited to rays which do not have greater incidence angles that 23° to the second reflecting face $S_1'$. Since any of the backward rays incident on the second reflecting face $S_1'$ has an angle $\theta_{1b}$ equal to or greater than 23 degrees, or $\theta_{1b} \geq 23°$, they are thus all shut out by the wedge prism 317, while those useful rays which find their incidence angles within a range of $0.5° \leq \theta_{1a} < 23°$ are allowed to reach the light sensor 315.

Figure 13:
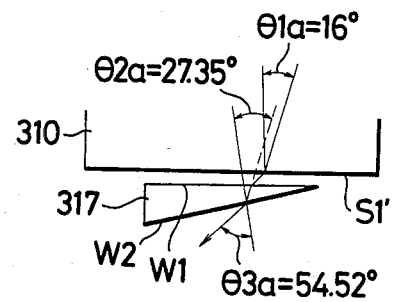

In FIG. 13, the principal ray is traced beginning with the angle $\theta_{1a} = 16°$ and terminating at an angle of emergence $\theta_{3a} = 54.52°$ from the exit face $S_2$, or an angle of 43.17° with respect to the normal of the second reflecting face $S_1'$.

As has been described above, according to this embodiment, the use of the wedge prism 317 provides the possibility of preventing light from reaching the sensor 315 thereby preventing a harmful noise component.

Figure 14:
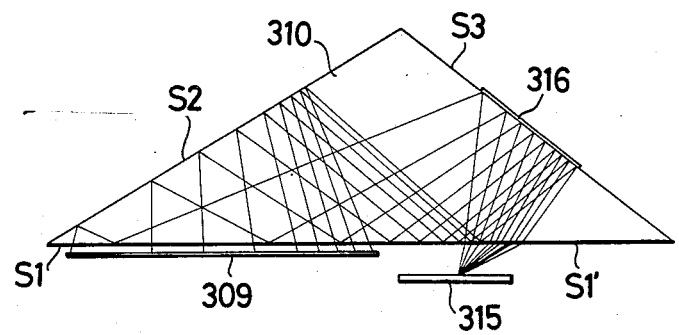
FIG. 14 is a sectional view to explain an optical phenomenon.

Returning to FIG. 6, as has been described above, either the exit face $S_3$ of the first prism 310 or the entrance face $S_4$ of the second prism 311 is provided with the beam splitter or mirror 316 so that part of the light totally reflected off the second reflecting face $S_1'$ of the first prism 310 is returned to the second reflecting face $S_1'$ and therefrom is further advanced outwardly, being directed to the sensor 315 positioned adjacent to the second reflecting face $S_1'$. For the sensor 315 is positioned as near to the focusing screen 309 as possible. Since their holders are, however, liable to mechanically interfere with each other, an unduly large space must be created between the focusing screen 309 and the sensor 315. This gives rise to a problem which will be explained by reference to FIG. 14. Because the center of the area of the light receiving surface of the sensor 315 deviates from the ideal point toward the eyepiece 312, the meter sensitive pattern is distorted. In FIG. 14, for the purpose of better understanding, ray tracing is reversed, showing how a set of rays radiating from the center of the area of the light receiving surface of the sensor 315 to equally spaced angles are spread on the focusing screen 309. It is seen at a glance that the meter sensitivity distribution becomes progressively denser as the distance from the upper line of the picture frame increases as shown in FIG. 15, providing an average light metering aspect with an emphasis on the lower portion of the picture frame.

Figure 15:
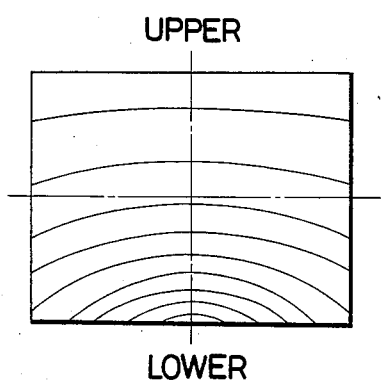
FIG. 15 shows a light meter sensitivity pattern.

With such a light meter as shown in FIG. 15, when portraits are taken, because, in most popular cases, the face of the sitter lies in the upper half of the picture frame, if his dress is black, the face will be extremely over-exposed, and if white, very under-exposed.

Figure 16:
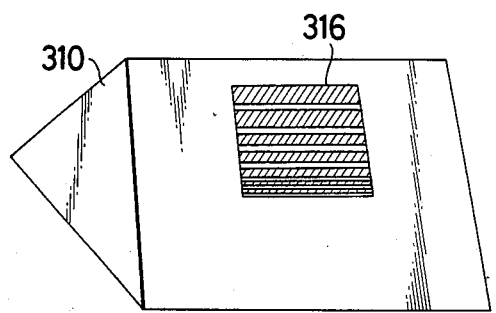
FIGS. 16 and 17 are perspective views illustrating the constructions of half-permeable portions respectively.

To cope with such photographic situations, the beam splitter or mirror 316 of FIG. 6 is divided into a number of horizontal stripes of progressively narrower widths as the distance from the second reflecting face $S_1'$ decreases, as shown in FIG. 16. By such a design and construction, the amount of light reflected gradually decreases with increases in the distance from the upper line of the picture frame, thereby the emphasis on the lower portion of the picture frame is removed. Thus, a uniform light distribution over the entire area of the light receiving surface of the sensor 315 is established. The combination of this with the variation of the sensitivity shown in FIG. 10 gives a perfect center-weighting average light metering pattern. Also, though, in FIG. 16, the pitches of the reflection stripes vary in the vertical direction, depending on the purpose, all the stripes may be divided laterally into a number of parts with an equal pitch or varying pitches. Instead of using the rectangular shape, it is also possible to use a circular shape. Further, the beam splitter or mirror 316 may be replaced by a reflective coating whose reflectivity continuously varies with the variation of the distance.

Note, the divided reflective areas may be either half-reflection mirror elements, or total reflection mirror elements.

Figure 17:
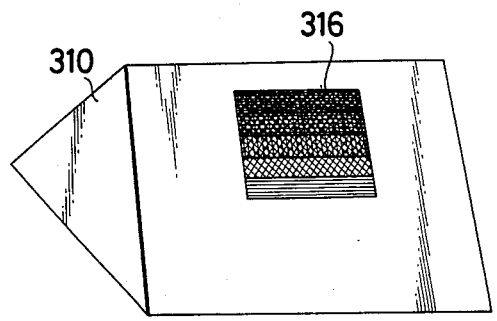

FIG. 17 illustrates another exmple of construction of the beam splitter or mirror 316 where the reflectivity varies continuously or stepwise, decreasing with a decrease in the distance from the second reflecting face $S_1'$. By this construction, the amount of light reflected from the beam splitter or mirror 316 gradually decreases with an increase in the distance from the upper line. As a result, the meter sensitivity distribution becomes uniform over the entire area of the picture frame, thus producing an equivalent effect to the center-weighting average metering pattern.

The coating of continuously varying reflectivities is not always higher in production cost, and a greater accuracy of reflectivity control is not always required. The half-reflective coating, of which the reflectivity varies stepwise of FIG. 17, can be manufactured by the following simple technique. That is, when a dielectric multi-layer coating is applied to the prism by vacuum depositing means, a great number of masks, of which the sizes of aperture vary stepwise, are prepared, and layers of different thickness and different material are successively superimposed one after another through the respective different masks. In this case, there is no need to regularly control the reflectivity and the size of aperture of the mask, and it is only required to establish a desired light meter sensitivity pattern.

What is claimed is:

1. A photographic optical apparatus comprising:
   (a) optical path selecting means for selecting one of two optical paths of an objective optical system;
   (b) image receiving means arranged in one of the two optical paths to receive an image of said objective optical system and produce a video signal;
   (c) optical filtering means arranged between said optical path selecting means and said image receiving means to apply optical filtering to an image to be received by said image receiving means;
   (d) optical directing means arranged on the other of said optical paths to change the direction of said other optical path;
   (e) a predetermined image plane lying in between said optical path selecting means and said optical directing means;
   (f) an eyepiece for observing said predetermined image plane through said optical directing means; and
   (g) optical correcting means for correcting the image performance due to said objective optical system, arranged in a space between said optical path selecting means and said predetermined image plane and having an optical path length which is substantially equal to the optical path length of said optical filtering means.

2. An apparatus according to claim 1, further comprising light measuring means, and wherein said optical correcting means splits light into two parts, one of which is directed to said light measuring means.

3. An apparatus according to claim 2, wherein said optical correcting means is a parallel flat plate having a beam splitter.

4. An apparatus according to claim 1, further comprising light measuring means, and wherein said optical directing means includes a first prism, a second prism and a reflective region between said first and said second prisms to provide light to said light measuring means.

5. An apparatus according to claim 4, further comprising an optical wedge for removing backward entering light from said eyepiece between said optical directing means and said light measuring means.

6. An apparatus according to claim 4, wherein said reflective region of said optical directing means has a predetermined reflectivity distribution for forming a desired light measuring distribution.

7. An apparatus according to claim 1, wherein said optical directing means includes a first prism for causing an even number of reflections and a second prism having a roof type reflection surface and a reflection surface for causing a reflection next thereto.

8. An apparatus according to claim 1, wherein said optical filtering means includes an optical low pass filter and a color separation filter.

9. An apparatus according to claim 8, wherein said optical filtering means further includes an infrared light cut filter and a protection plate.

10. A photographic optical apparatus, comprising:
    image receiving means for receiving an image formed by an objective lens to produce a video signal;
    observing means for observing the image formed by the objective lens;
    optical path selecting means for selecting either an optical path from the objective lens to said image receiving means, or an optical path from the objective lens to said observing means;
    a plurality of optical filters arranged between the optical path selecting means and said image receiving means;
    focus discriminating means, for discriminating a focal condition and determining an image plane, arranged between said optical path selecting means and said observing means; and
    optical correcting means arranged between said optical path selecting means and said image plane and having an optical path length substantially equal to an optical path length synthesized by said filters.

11. An apparatus according to claim 10, wherein one of said optical filters is an optical low pass filter, and another one of said optical filters is a color-separation filter.

12. An apparatus according to claim 11, wherein still another of said optical filters is an infrared light cut filter.

13. An apparatus according to claim 10, wherein said optical path length of said optical correcting means is within ±20% of the synthesized optical path length.

14. An apparatus according to claim 10, further comprising photosensing means, wherein said optical correcting means comprises a light splitting plate which splits the light to said photosensing means.

15. An apparatus according to claim 14, wherein said light splitting plate is 3 mm to 12 mm thick.

16. An apparatus according to claim 14, wherein said light splitting plate has an oblique half-reflection mirror.

17. An apparatus according to claim 14, wherein said light splitting plate comprises an optical grating.

18. An apparatus according to claim 10, wherein said optical correcting means is 3 mm to 12 mm thick.

19. A photographic optical apparatus, comprising:
    image receiving means for receiving an image formed by an objective lens to produce a video signal;
    observing means for observing said image formed by said objective lens;
    optical path selecting means for selecting either an optical path from said objective lens to said image receiving means, or an optical path from said objective lens to said observing means;

a focus screen, for discriminating a focus condition and determining an image plane, arranged between said optical path selecting means and said observing means;

optical filtering means, for filtering an image light incident on said image receiving means, arranged between said optical path selecting means and said image receiving means; and optical correcting means, for correcting an image formed on said image plane to have substantially a same focal quality as an image formed on said image receiving means, arranged between said optical path selecting means and said focus screen.

20. An apparatus according to claim 19, wherein said optical filtering means comprises an optical low pass filter, a color separation filter, and an infrared cut filter.

21. An apparatus according to claim 19, wherein said optical filtering means comprises an optical low pass filter and a color-separation filter.

22. An apparatus according to claim 19, wherein said optical filtering means comprises an infrared light cut filter.

23. An apparatus according to claim 19, wherein an optical path length of said optical correcting means is within ±20% of an optical path length synthesized by said optical filter means.

24. An apparatus according to claim 19, further comprising photosensing means, wherein said optical correcting means has a light splitting plate which splits the light to said photosensing means.

25. An apparatus according to claim 24, wherein said light splitting plate is 3 mm to 12 mm thick.

26. An apparatus according to claim 24, wherein said light splitting plate comprises an oblique half-reflection mirror.

27. An apparatus according to claim 24, wherein said light splitting plate comprises an optical grating.

28. An apparatus according to claim 19, wherein said optical correcting means is 3 mm to 12 mm thick.

* * * * *